(12) United States Patent
Han (10) Patent No.: US 6,175,387 B1
(45) Date of Patent: Jan. 16, 2001

(54) DEVICE FOR CONVERTING VIDEO RECEIVED IN DIGITAL TV

(75) Inventor: Dongil Han, Seoul (KR)

(73) Assignee: LG Electronics Inc., Seoul (KR)

( * ) Notice: Under 35 U.S.C. 154(b), the term of this patent shall be extended for 0 days.

(21) Appl. No.: 09/198,248

(22) Filed: Nov. 24, 1998

(30) Foreign Application Priority Data

Dec. 10, 1997 (KR) .................................................. 97/67455

(51) Int. Cl.$^7$ .............................. H04N 5/46; H04N 5/45
(52) U.S. Cl. ........................... 348/565; 348/555; 348/557
(58) Field of Search ..................................... 348/554, 555, 348/556, 557, 558, 563, 564, 565, 566, 725, 728, 441, 445, 446, 706; H04N 5/46, 5/45

(56) References Cited

U.S. PATENT DOCUMENTS

| | | | | |
|---|---|---|---|---|
| 5,208,660 | * | 5/1993 | Yoshida | 348/558 |
| 5,389,974 | * | 2/1995 | Bae | 348/558 |
| 5,485,216 | * | 1/1996 | Lee | 348/555 |
| 6,067,123 | * | 5/2000 | Lee | 348/554 |

* cited by examiner

*Primary Examiner*—Michael Lee (57) ABSTRACT

Apparatus and method for converting a video received in a digital TV to process video data with different formats using the same ports. The apparatus and method includes a process to convert the video data from one format to another format and a process to convert the sync signals of one video format to correspond to the sync signals of another video format. Thus, different videos such as NTSC or VGA signals can be interfaced using signals of a small number of ports, thereby to reducing an overall size of the necessary hardware.

12 Claims, 6 Drawing Sheets

FIG.1
Background Art

(a) clock (b) horizontal synchronizing signal

(c) Y signal (d) C signal

FIG.2
Background Art (a) horizontal synchronizing signal (b) vertical synchronizing signal (c) actual data

(a) clock (b) horizontal synchroniziong signal (c) Y signal (d) C signal

FIG.10

(a) horizontal synchroniziong signal (b) vertical synchroniziong signal (c) actual data

DEVICE FOR CONVERTING VIDEO RECEIVED IN DIGITAL TV

BACKGROUND OF THE INVENTION

1. Field of the Invention

The present invention relates to a digital TV, and more particularly to a method and apparatus for processing received video data of different video formats.

2. Discussion of the Related Art

A digital TV may receive an NTSC signal or an VGA signal. Accordingly, if one were to examine the number of signal lines necessary for interfacing an NTSC signal with a digital TV receiver, only one pin is required for the analog NTSC signal. Because an analog signal includes the luminance signal Y, the carrier color signal C, and the horizontal/vertical synchronizing signals, one pin can interface an analog NTSC signal. However, more than one is necessary if the NTSC signal is digitized before interfacing the signal with the digital TV.

The VGA signal also requires more than one pin. Specifically, five pins are necessary for interfacing the VGA signal which includes Red (R), Green (G), Blue (B), and vertical/horizontal synchronizing signals. Therefore, if the NTSC and the VGA signals are simultaneously processed, a great number of signal lines are necessary for interfacing the signals, thereby requiring a complicated hardware.

Figure 1:
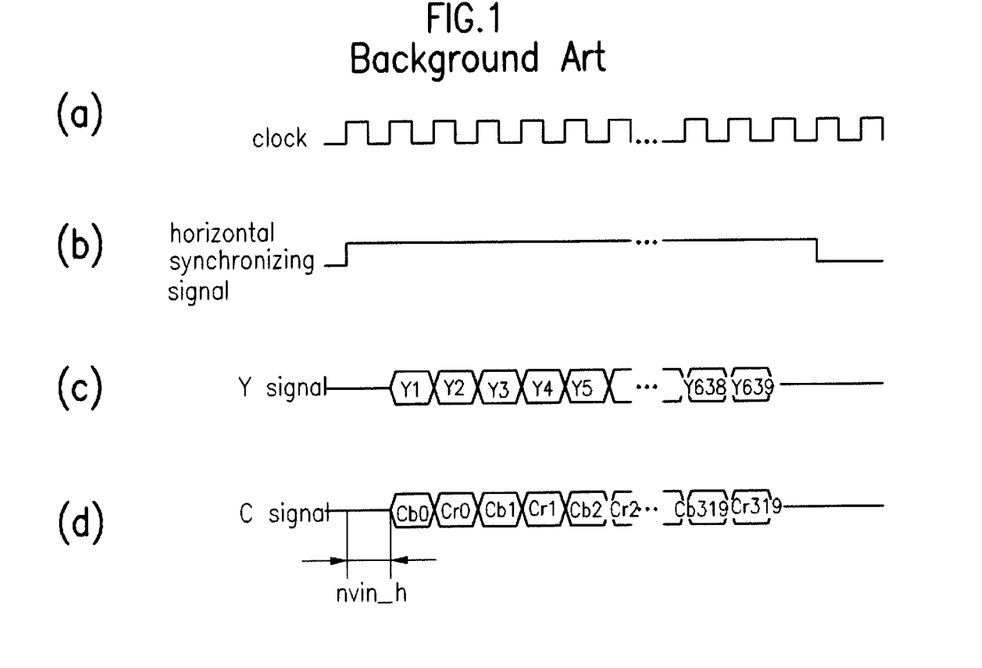
FIG. 1 shows the differences between the Y and C signals of a VGA signal to a Hsync signal of an NTSC signal in the background art.
Figure 2:
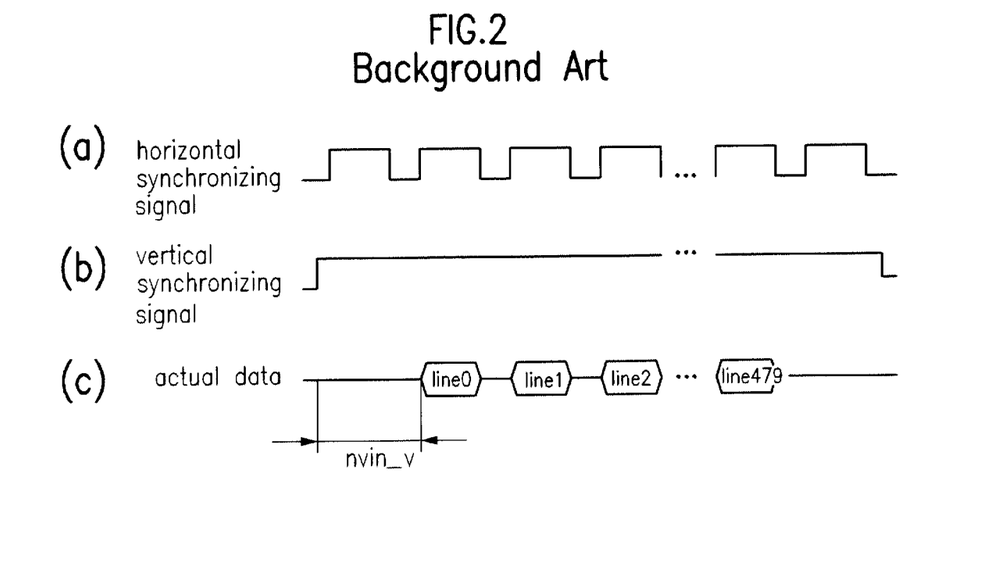
FIG. 2 shows the differences among an actual data of a VGA signal, a Hsync signal and a Vsync signal of an NTSC signal in a background art.

Moreover, additional memory is required during the VGA signal interfacing if the difference between the locations of synchronizing signal intervals and effective data is ignored. For example, a horizontal synchronizing (Hsync) signal is shown in FIG. 1 (b) with respect to the clock shown in (a). However, because the signals Y and C are underscanned, the Y and C signals are generated after the Hsync signal as shown in (c) and (d), by a period of nvin_h. Referring to FIG. 2(b), a vertical synchronizing (Vsync) signal is generated with respect to the Hsync signal shown in (a) and the actual video data is also generated after the Vsync by a period of nvin_v shown in (c). As a result, the VGA synchronizing signal and the VGA video signal have different starting points, causing a storage of a portion without an actual video image. The different starting points causes a waste of memory space.

SUMMARY OF THE INVENTION

Accordingly, an object of the present invention is to solve at least the problems and disadvantages of the related art.

Another object of the present invention is to minimize the necessary hardware for a digital TV receiver which can simultaneously process and display input videos with different formats.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the digital TV receiver according to the present invention includes a video scaler for receiving a first or a second video and scaling the video; a pretreater for converting the second video format into the first video format; a selector for selecting and forwarding a first video signal or the second video signal from the pretreater, or a scaled first or converted second video signal from the video scaler according to a display format; a synchronization converter for adjusting a synchronizing signal of the second video format into a form identical to a synchronizing signal of the first video signal; and a display processor for displaying the video from the selector according to the synchronizing signal from the synchronization converter.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 3:
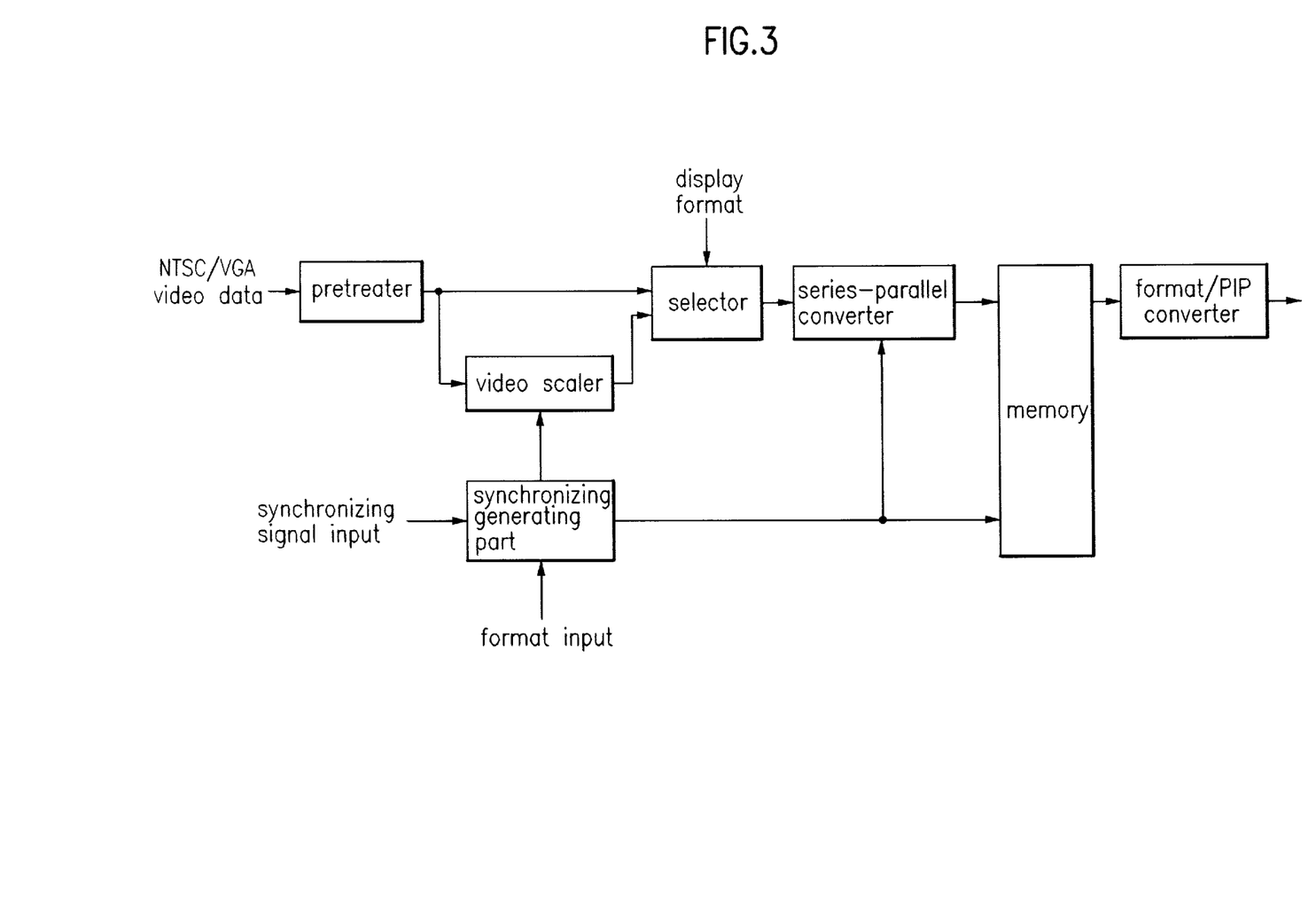
FIG. 3 illustrates a block diagram of a general embodiment of a digital TV receiver for converting an input video according to the present invention.

FIG. 3 shows a preferred embodiment of the present invention. Generally, the preferred embodiment includes a video scaler receiving a first video or a pre-converted second video, scaling the received video, and outputting a scaled video to the selector; a pretreater receiving a first video or a second video, converting the second video format into the first video format, and outputting the first video or the pre-converted second video to the selector. The selects selectively outputs the first video signal or the pre-converted second signal from the pretreater, or the scaled video from the video scaler, depending on the display format.

Also, to interface the first video signal and the second video signal using the same port, a synchronization converter adjusts a difference between the sync signal of the second video signal to coincide with the sync signal of the first video signal and to correspond to the effective data. Moreover, a series-parallel converter converts the video data received through the selector into a parallel video data and stores in a memory at a high speed. A format/PIP converter reads the stored video data and converts the size of the data to fit the display format.

The present invention will be described in detail with reference to FIGS. 4, 5, and 6. Particularly, FIG. 4 illustrates a detailed block diagram of one embodiment of the digital TV receiver for converting a received video according to the present invention, FIG. 5 illustrates a detailed block diagram of the pretreater of FIG. 4, and FIG. 6 illustrates a detailed block diagram of the synchronization converter of FIG. 4.

Figure 4:
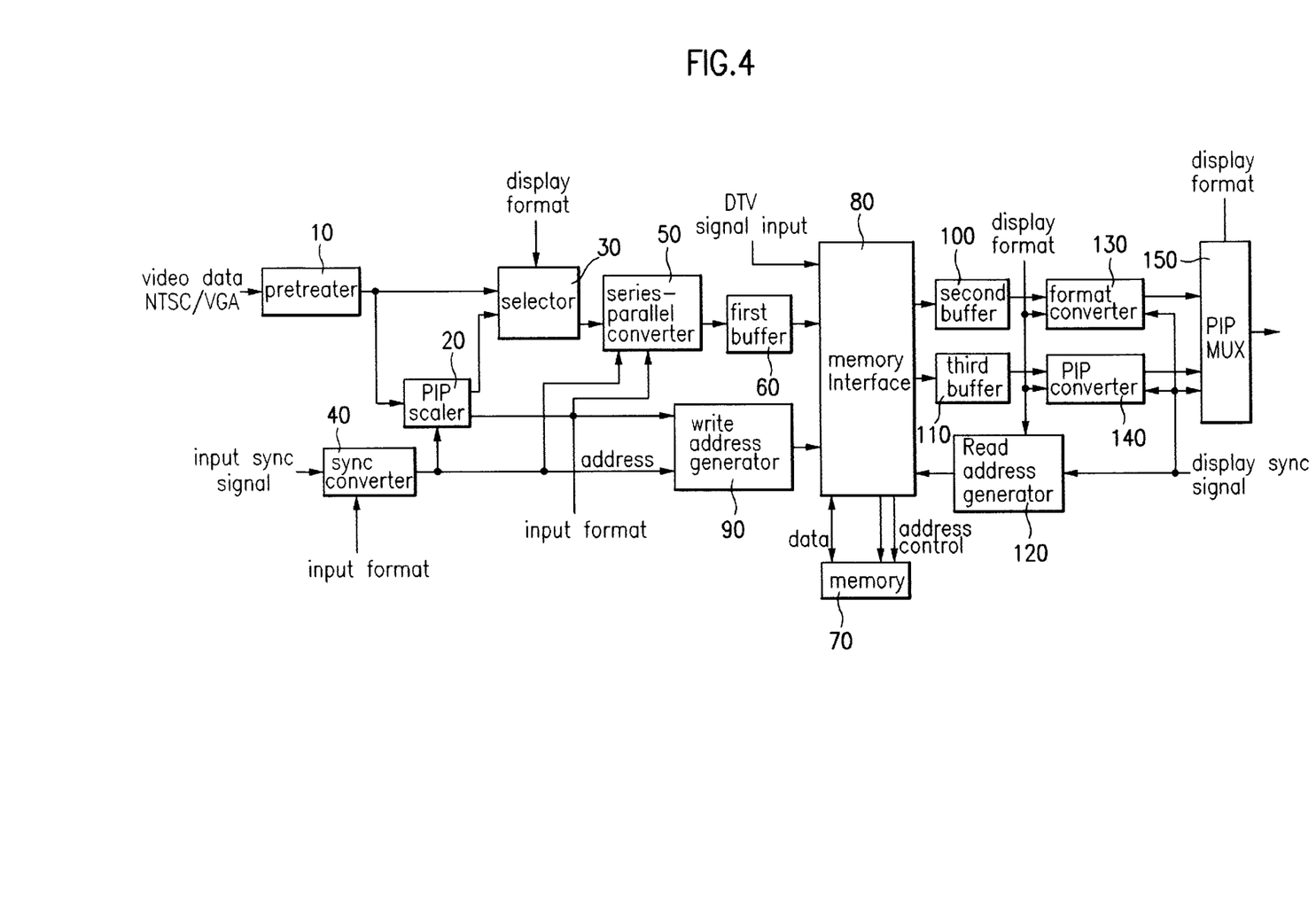
FIG. 4 illustrates a block diagram of a specific embodiment of a digital TV receiver in FIG. 3.

Referring to FIG. 4, a preferred embodiment of a digital TV receiver for converting the input video according to the present invention includes a pretreater 10 receiving the NTSC or VGA video data and converting the data into a digital signal before outputting the data as Y and C signals; a PIP scaler 20 receiving the pretreated video data from the pretreater 10 and scaling the frame size of the pretreated data according to the display format; a selector 30 receiving and depending on the display format, selectively outputting one of either the scaled video from the PIP scaler 20, or the original NTSC or VGA data from the pretreater 10; a sync converter 40 adjusting the synchronizing (sync) signal such that the timing of the sync signal corresponds to the actual data interval of the received data according to the input format; a series-parallel converter 50 grouping the video data selected by the selector 30 into units of 4~8 bytes according to input format and outputting the units to correspond with the sync signal generated by the sync converter 40; a first buffer 60 temporarily storing the video data from the series-parallel converter 50; a memory 70 storing and outputting the video data; a memory interface 80 writing the video data from the buffer 60 on or reading the stored data from the memory 70; a write address generator 90 generating the address to write the video data from the first buffer 60 on the memory 70; a second buffer 100 and a third buffer 110 temporarily storing the video data read from the memory 70; a read address generator 120 generating the address to read the video data from the memory 70 to the buffers 100 and 110, according to the display format; a format converter 130 converting the video data received from the second buffer 100 into a data format consistent to the main screen display according to the display format; a PIP converter 140 changing the size of the video data received from the third buffer 110 to fit the size of a PIP window according to the display format; and a PIP multiplexer 150 selecting and displaying either the main screen video data from the format converter 130 or the PIP video data from the PIP converter 140, according to the display format.

Figure 5:
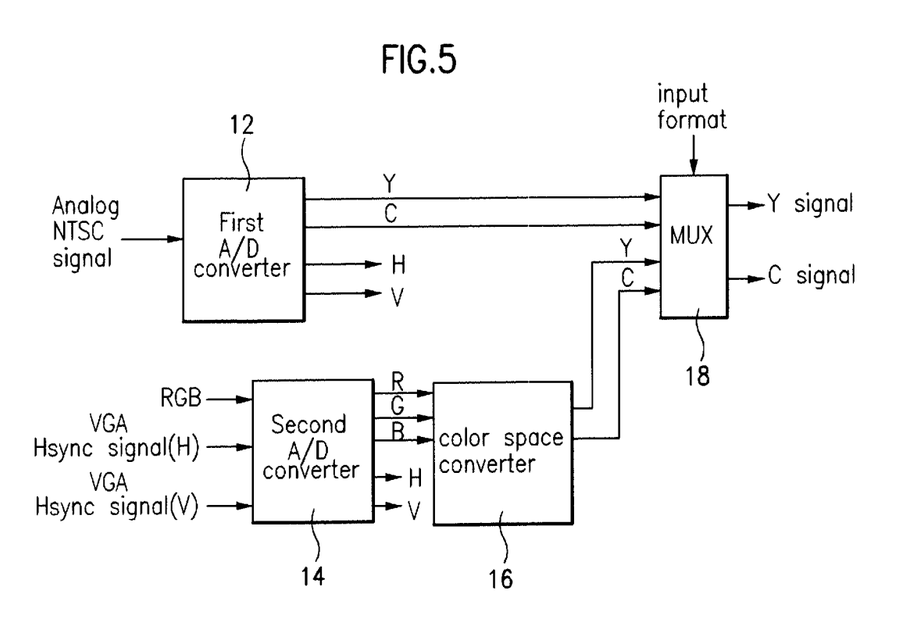
FIG. 5 illustrates a block diagram for explaining the pretreater in FIG. 4.

As shown in FIG. 5, the pretreater 10 further includes a first analog to digital (A/D) converter 12 receiving the NTSC signal, digitizing the analog NTSC signal into a digital luminance Y and color C signals, and outputting the digitized Y and C signals with the sync signals H and V; a second A/D converter 14 receiving the VGA signal, digitizing the RGB data and sync signals H and V, and outputting the digitized RGB data with the digitized sync signals H and V; a color space converter 16 converting the digital RGB, H, and V signals from the second A/D converter 14 into a luminance Y and color C signals; and a multiplexer (MUX) 18 selecting and outputting either the NTSC video from the first A/D converter 12 or the VGA video from the color space converter 16, according to the input format.

Figure 6:
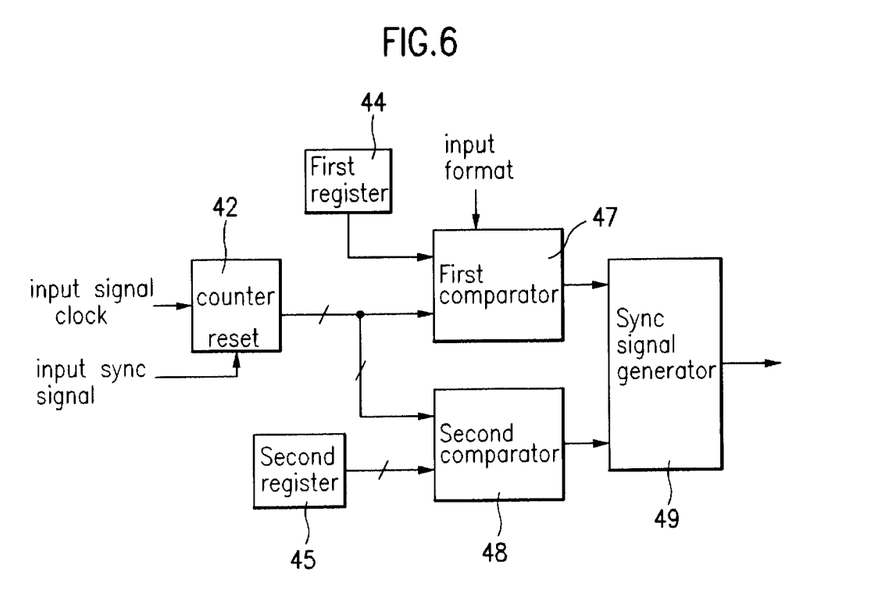
FIG. 6 illustrates a block diagram for explaining the synchronization converter in FIG. 4.

Also, as shown in FIG. 6, the sync converter 40 further includes a counter 42 counting synchronously with an external signal clock; a first register 44 storing the count value of when the VGA video sync signal should rise to correspond with the effective data, taking into account the time intervals between the sync signal and the data; a second register 45 storing a count value of when the VGA video sync signal should fall with respect to the effective data; a first comparator 47 outputting a sync signal if the input format is the VGA video and if the value counted in the counter 42 corresponds to the count value stored in the first register 44; a second comparator 48 outputting a sync signal if the input format is the VGA video and the value counted in the counter 42 corresponds with the value stored in the second register 48; and a sync signal generator 49 outputting the rising sync signal from the first comparator 47 and the falling sync signal from the second comparator 48.

Figure 7:
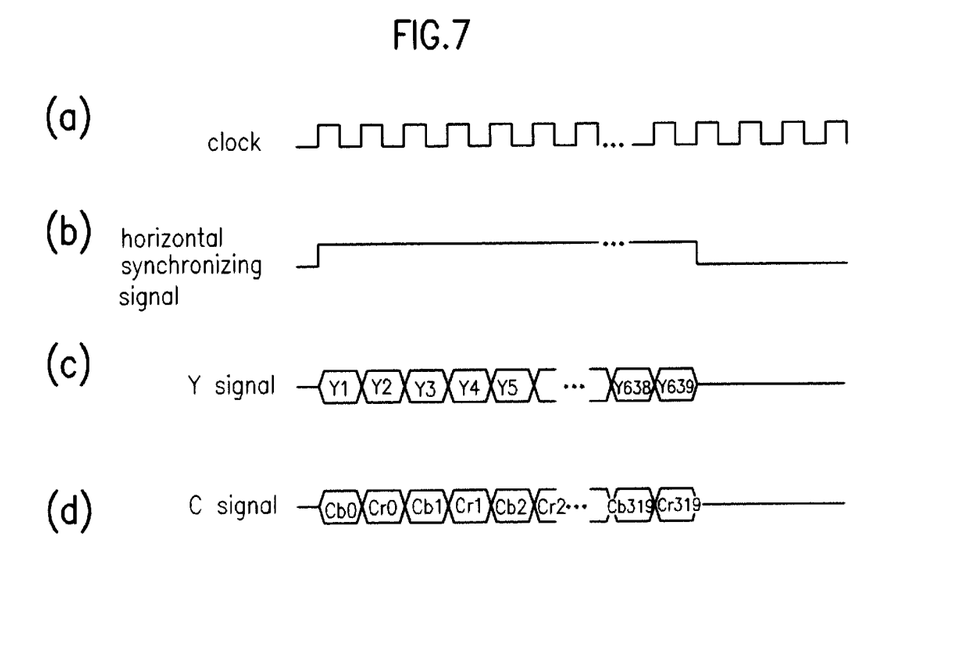
FIG. 7 shows the waveforms of VGA data and a VGA Hsync signal after a sync conversion by the sync converter in FIG. 6.
Figure 8:
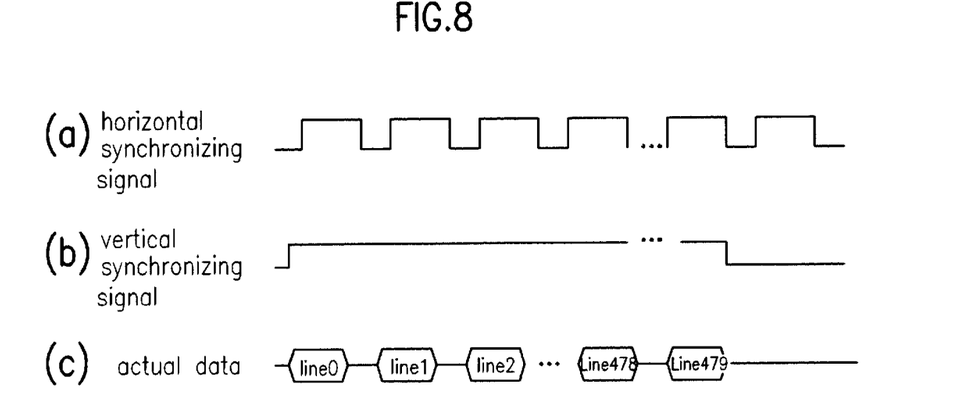
FIG. 8 shows the waveforms of VGA data and a VGA Vsync signal after a sync conversion by the sync converter in FIG. 6.
Figure 9:
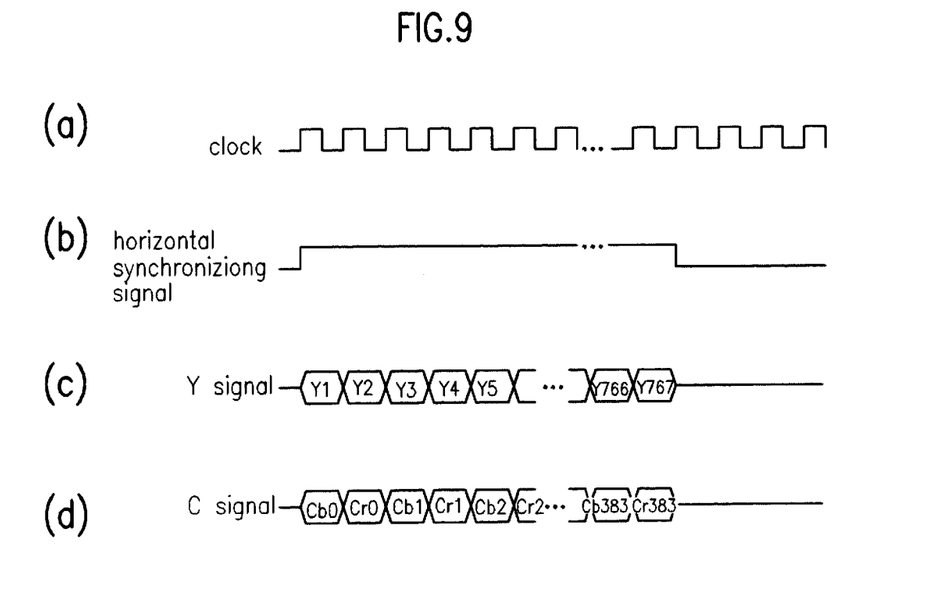
FIG. 9 shows the waveforms of NTSC data in a form identical to an NTSC Hsync signal after a sync conversion by the sync converter in FIG. 6.
Figure 10:
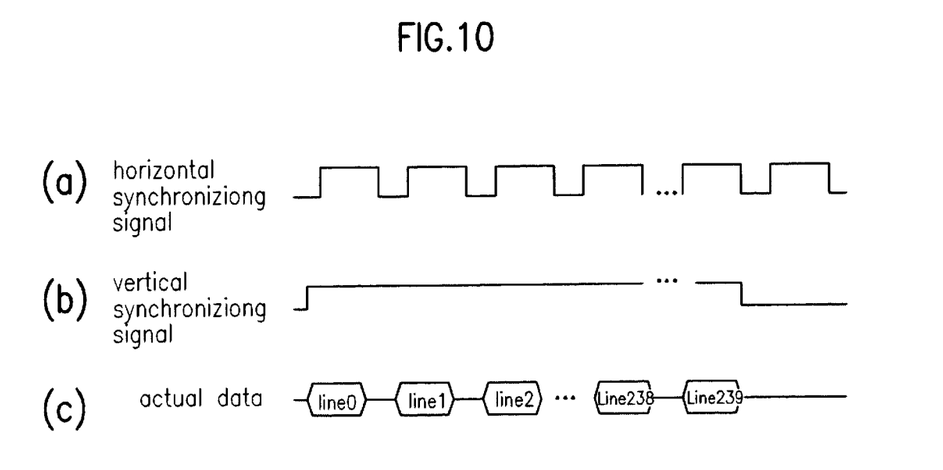
FIG. 10 shows the waveforms of NTSC data in a form identical to an NTSC Vsync signal after a sync conversion by the sync converter in FIG. 6.

The operation of the aforementioned digital TV receiver for converting the input video will be explained with reference to the figures. Particularly, FIGS. 7 and 8 shows a modified Hsync and Vsync of the VGA after a conversion by the sync converter 40. FIGS. 9 and 10 illustrate the NTSC data in a form corresponding to the NTSC Hsync signal and the NTSC Vsync signal after a conversion by the sync converter 40. Briefly, the VGA signals shown in FIGS. 1 and 2 are converted into an NTSC type sync signal as shown in FIGS. 7 and 8 by the digital TV receiver.

More specifically, if the PIP scaler 20 receives the display format information indicating a PIP format, the PIP scaler 20 scales the size of the input NTSC/VGA video in both the horizontal and vertical directions, and outputs the scaled image to the selector 30. Because the NTSC sync signals and the VGA signals are different as shown in FIGS. 1 and 9, if a VGA signal is received, the sync converter 40 converts the VGA signal to generate the sync signal during the interval corresponding to the actual video data.

To convert the sync signals, the rising and falling positions of the VGA video sync signal with respect to the different time interval between the sync signal and the effective data are stored in the first and second registers 44, 45. If the input format is the VGA video, the first comparator 47 counts the VGA video sync signal from the counter 42 and outputs the sync signal to the sync signal generator 49 such that the rising of the sync signal corresponds to the beginning of the effective data. Also, the second comparator 48 counts the VGA video sync signal from the counter 42 and outputs the sync signal to the sync signal generator 49 such that the falling of the sync signal corresponds to the end portion of the effective data of the VGA video. By converting the sync signal in the horizontal and vertical directions, both the VGA and NTSC video can be processed by the same hardware.

According to the clock shown in FIG. 7(a), the sync converter 40 adjusts the interval of the sync signal to coincide with the effective data and outputs the sync signal corresponding to the NTSC type Hsync signal as shown in FIG. 7(b). Afterwards, the effective data interval of the VGA video signals Y and C are output according to the Hsync signal as shown in FIGS. 7(c) and (d). After converting and generating the interval of VGA Vsync signal to correspond to the NTSC type Vsync signal as shown in FIGS. 8(a) and (b), the actual VGA video data begins and ends together with the rising and falling of the sync signal as shown in FIG. 8(c). The converted VGA sync signals are output together with the VGA data to the PIP scaler 20 and the series-parallel converter 50.

Referring back to FIG. 5, the pretreater 10 converts an analog NTSC video data into a digital Y and C signals through the first A/D converter 12, and also converts an analog VGA video data into a digital Y and C signals with the NTSC format through the color space converter 16 after digitizing the RGB signal through the second A/D converter 14. Receiving both the digital NTSC Y and C video signals from the first A/D converter 12 and the digital VGA Y and C video signals from the color space converter 423, the MUX 18 selectively outputs the Y and C signals of a pertinent video according to an input format.

The selector 30 receives the scaled NTSC/VGA video from the PIP scaler 20 and the NTSC/VGA video from the pretreater 10, and selectively forwards the appropriate video according to the display format. The selector 30 forwards a video from the PIP scaler 20 when a NTSC/VGA video with a PIP format is required, but otherwise forwards an original NTSC/VGA video from the pretreater 40. To facilitate an access by the memory 70, the series-parallel converter 50 re-arranges the video received in 1 byte units from the selector 30 into a data bus of 4~8 bytes according to an input format thereby increasing the memory bandwidth.

The first buffer 60 temporarily stores the data from the series-parallel converter 50. When the memory 70 is available, the first buffer 60 outputs the data to be written through the memory interface 80 and writes at the address generated by the write address generator 90. The second and third buffers 49 and 50 reads and temporarily stores a threshold level amount of video data from the memory 46 and outputs the data to the format converter 130 and the PIP converter 140. The read address generator 120 generates a read address to the memory 46 and outputs the data to the second and third buffers 100 and 110, when the amounts of data in the second and third buffers 100 and 110 fall below the threshold level according to the display format.

Depending on the display format, the NTSC or VGA video is displayed on the main screen, the NTSC video is displayed on the main screen while the DTV video is displayed on a PIP screen, or the VGA video is displayed on the main screen while the DTV video is displayed on a PIP screen. For these display formats, the format converter 130 converts the size of the NTSC or VGA video received from the second buffer 100 to fit the main screen. For video formats when the DTV video is displayed on the main screen while the NTSC or VGA video is displayed on the PIP screen, the PIP converter 140 converts the size of the NTSC or VGA video received from the third buffer 110 to fit the size of the PIP screen. According to the display format, the PIP MUX 150 selects and synchronously outputs the main screen video from the format converter 130 or the PIP screen video from the PIP converter 140 with respect to the display sync signal. Specifically, the PIP MUX 150 outputs the data for the main screen when the display format only requires a video for the main screen, but outputs both the data for the main screen and the PIP screen to the appropriate location when the display format requires the video for a PIP screen. Also, when only a video for the PIP screen is required, such as an OSD and the like, the data for the PIP screen is only output.

In sum, the digital TV receiver according to the present invention is capable of displaying a DTV signal as used in the United States, and by using the same ports the present invention can interface an NTSC or a VGA signal with a minimum number of ports. Also, the present invention can simultaneously display a DTV and an NTSC video signals or a DTV and a VGA video signals using the signals of a small number of ports. Moreover, because the sync signals of the NTSC and VGA signals have different characteristics, the difference between the VGA sync signal and the effective data is adjusted and converted into a form such that the two signals can be processed by the same hardware. Thus, two videos of different formats can be processed in the same hardware using the information on the input video, thereby allowing reduction of an overall size of the necessary hardware.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A system for converting a video received by a digital TV comprising:

a pretreater receiving a video of a first format and a video of a second format, converting the video of a second format into the first format; said pretreater selecting and outputting the video of a first format or the converted video of a second format, according to the input format;

a PIP scaler receiving the selected video of a first format or the converted video of a second format from said pretreater; said PIP scaler scaling the received video and outputting a scaled video of a first format or a scaled converted video of a second format;

a sync converter receiving the sync signals of the video of the first format and the second format; said sync converter adjusting the sync signal of the video of the second format to correspond to the sync signal of the video of the first format and outputting the sync signal of the video of the first format and a converted sync signal of the video of the second video format;

a selector receiving the display format and the outputs from said pretreater and said PIP scaler; said display processor selecting and outputting one of the video of the first format, converted video of the second format, scaled video of the first format, or scaled video of the second format; and a display processor receiving the display format, the input format, the selected video from said selector and the sync signals from said sync converter; said display processor displaying the selected video with respect to the received sync signals according to the display format.

2. A system of claim 1, wherein said pretreater further comprises:

a first A/D converter receiving the video of the first format, converting the video of the first format into digital signals and outputting digital video signals of the first format and the digital sync signals of the video of the first format;

a video converter receiving the video of the second format, converting the video of the second format into digital signals of the first format and outputting converted digital video signals of the second format and the digital sync signals of the video of the second format; and a MUX receiving the digital video signal outputs from said first A/D converter and said video converter; said MUX selecting and outputting either the digital video signals of the first format or the converted digital signals of the second format.

3. A system of claim 2, wherein said video converter further comprises:

a second A/D converter receiving the video of the second format converting the video of the second format into digital signals and outputting digital video signals of the second format and the digital sync signals of the video of the second format; and a color space converter receiving the output from said second A/D converter and converting a color space of the second format into a color space of the first format;

said color space converter outputting converted digital video signals of the second format.

4. A system of claim 3, wherein said first A/D converter receives an analog NTSC signal and outputs a digital luminance signal and color signals; said second A/D converter receives a VGA signal and outputs digital RGB signals; and said color space converter converts the digital RGB signals into a luminance signal and color signals.

5. A system of claim 1, wherein said sync converter adjusts both the horizontal sync signal and the vertical sync signal of the video of the second format to correspond to the horizontal sync signal and vertical sync signal of the video of the first format and outputting the horizontal and vertical sync signals of the video of the first format and a converted horizontal and vertical sync signals of the video of the second video format.

6. A system of claim 1, wherein said sync converter further comprises:
   a counter counting synchronously with an external signal clock and outputting the count;
   a first register storing the count value of when the sync signal of the video of the second format should rise to correspond with an effective data;
   a second register storing a count value of when the sync signal of the video of the second format should fall;
   a first comparator outputting the sync signal if the input format is the second format and if the value counted in said counter corresponds to the count value stored in said first register;
   a second comparator outputting the sync signal if the input format is the second format and the value counted in said counter corresponds with the value stored in said second register; and
   a sync signal generator outputting the rising sync signal portion of the video of the second format from said first comparator and the falling sync signal portion of the video of the second format from said second comparator; wherein said rising sync signal and the falling sync signal portions correspond to the sync signals of the video of the first format.

7. A system of claim 1, wherein said display processor comprises:
   a series-parallel converter receiving the selected video output from said selector, said series-parallel converter re-arranging the selected video into data buses of a plurality of bytes according to the input format and outputting video data buses to correspond with the sync signal received from said sync converter.

8. A system of claim 7, wherein said display processor further comprises:
   a memory receiving the display format and the video data buses from said series-parallel converter; said memory storing the video data buses and timely outputting the video data buses according to display format;
   a first buffer and a second buffer receiving a threshold amount of the video data buses from said memory, said first buffer and second buffer temporarily storing the video data buses and timely outputting the video data buses;
   a format converter receiving the display format and the video data buses from said first buffer, said format converter converting the video data buses to fit the size of the main screen display according to the display format and outputting a main screen video data;
   a PIP converter receiving the display format and the video data buses from said second buffer, said PIP converter changing the size of the video data buses to fit the size of a PIP window screen display according to the display format and outputting a PIP window screen video data; and
   a PIP MUX receiving the outputs from said format converter and said PIP converter, said PIP MUX selecting and displaying only the main screen video data, only the PIP window screen video data, or both the main screen and the PIP window screen video data, according to the display format.

9. A system for converting a video received by a digital TV comprising:
   a first AID converter receiving the video of a first format, converting the video of the first format into digital signals and outputting digital video signals of the first format and the digital sync signals of the video of the first format;
   a second AID converter receiving the video of a second format, converting the video of the second format into digital signals and outputting digital video signals of the second format and the digital sync signals of the video of the second format;
   a color space converter receiving the output from said second A/D converter and converting a color space of the second format into a color space of the first format; said color space converter outputting converted digital video signals of the second format;
   a MUX receiving the digital video signal outputs from said first A/D converter and said color space converter; said MUX selecting and outputting either the digital video signals of the first format or the converted digital signals of the second format;
   a PIP scaler receiving the selected video of a first format or the converted video of the second format from said MUX; said PIP scaler scaling the received video and outputting a scaled video of a first format or a scaled converted video of a second format;
   a sync converter receiving the sync signals of the video of the first format and the second format; said sync converter adjusting the sync signal of the video of the second format to correspond to the sync signal of the video of the first format and outputting the sync signal of the video of the first format and a converted sync signal of the video of the second video format;
   a selector receiving the display format and the outputs from said MUX and said PIP scaler; said display processor selecting and outputting one of the video of the first format, converted video of the second format, scaled video of the first format, or scaled video of the second format; and
   a display processor receiving the display format, the input format, the selected video from said selector and the sync signals from said sync converter; said display processor displaying the selected video with respect to the received sync signals according to the display format.

10. A system for converting a video received by a digital TV comprising:
   a first A/D converter receiving the video of a first format, converting the video of the first format into digital signals and outputting digital video signals of the first format and the digital sync signals of the video of the first format;
   a second A/D converter receiving the video of a second format, converting the video of the second format into digital signals and outputting digital video signals of the second format and the digital sync signals of the video of the second format;

a color space converter receiving the output from said second A/D converter and converting a color space of the second format into a color space of the first format; said color space converter outputting converted digital video signals of the second format;

a MUX receiving the digital video signal outputs from said first A/D converter and said color space converter; said MUX selecting and outputting either the digital video signals of the first format or the converted digital signals of the second format;

a PIP scaler receiving the selected video of the first format or the converted video of the second format from said MUX; said PIP scaler scaling the received video and outputting a scaled video of the first format or a scaled converted video of the second format;

a counter receiving the sync signals of the video of the first and second formats, said counter counting synchronously with an external signal clock and outputting the count;

a first register storing the count value of when the sync signal of the video of the second format should rise to correspond with an effective data;

a second register storing a count value of when the sync signal of the video of the second format should fall;

a first comparator outputting the sync signal if the input format is the second format and if the value counted in said counter corresponds to the count value stored in said first register;

a second comparator outputting the sync signal if the input format is the second format and the value counted in said counter corresponds with the value stored in said second register;

a sync signal generator receiving the sync signals of the video of the first and second formats, said sync signal generator outputting the sync signals of the video of the first format and the rising sync signal portion of the video of the second format from said first comparator and the falling sync signal portion of the video of the second format from said second comparator; wherein said rising sync signal and the falling sync signal portions correspond to the sync signals of the video of the first format;

a selector receiving the display format and the outputs from said MUX and said PIP scaler; said display processor selecting and outputting one of the video of the first format, converted video of the second format, scaled video of the first format, or scaled video of the second format; and a display processor receiving the display format, the input format, the selected video from said selector and the sync signals from said sync signal generator; said display processor displaying the selected video with respect to the received sync signals according to the display format.

11. A method for converting a video received by a digital TV comprising:

receiving a video of a first format and a video of a second format, converting the video of the second format into the first format;

selecting and outputting the video of the first format or the converted video of the second format, according to the input format;

receiving and scaling the selected video and outputting a scaled video of the first format or a scaled converted video of the second format;

adjusting the sync signal of the video of the second format to correspond to the sync signal of the video of the first format and outputting the sync signal of the video of the first format and a converted sync signal of the video of the second format;

selecting and displaying one of the video of the first format, converted video of the second format, scaled video of the first format, or scaled video of the second format, with respect to the sync signal of the first format or the converted sync signal of the video of the second format according to the display format.

12. A method of claim 11, wherein said video of the first format is an NTSC signal and said video of the second format is an VGA signal.

* * * * *